(12) United States Patent
Okawa

(10) Patent No.: US 10,746,616 B2
(45) Date of Patent: Aug. 18, 2020

(54) TRANSFER APPARATUS

(71) Applicant: Azbil Corporation, Tokyo (JP)

(72) Inventor: Yoichi Okawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 4 days.

(21) Appl. No.: 16/316,547

(22) PCT Filed: May 25, 2017

(86) PCT No.: PCT/JP2017/019631
§ 371 (c)(1),
(2) Date: Jan. 9, 2019

(87) PCT Pub. No.: WO2018/012125
PCT Pub. Date: Jan. 18, 2018

(65) Prior Publication Data
US 2019/0310149 A1    Oct. 10, 2019

(30) Foreign Application Priority Data

Jul. 12, 2016  (WO) .................. PCT/JP2016/070619

(51) Int. Cl.
*G01L 3/14* (2006.01)
*G01B 21/22* (2006.01)
(Continued)

(52) U.S. Cl.
CPC ............ *G01L 3/1492* (2013.01); *G01B 21/00* (2013.01); *G01B 21/22* (2013.01); *G01L 3/00* (2013.01)

(58) Field of Classification Search
CPC ........... G01L 3/14; G01L 3/1492; G01L 3/00; G01B 21/22; G01B 21/00; B65G 54/02; B65G 25/04; F26B 5/06
(Continued)

(56) References Cited

U.S. PATENT DOCUMENTS

| 1,914,842 A | * | 6/1933 | Barthelemy | ............ | H04N 5/04 |
| | | | | | 318/47 |
| 5,841,273 A | * | 11/1998 | Muraji | ................... | G01B 7/30 |
| | | | | | 324/207.17 |

(Continued)

FOREIGN PATENT DOCUMENTS

| JP | H10-132977 A | | 5/1998 |
| JP | H10132977 | * | 5/1998 |

(Continued)

OTHER PUBLICATIONS

International Search Report received for PCT Patent Application No. PCT/JP2017/019631, dated Aug. 22, 2017, 4 page (2 pages of English Translation of International Search Report, 2 pages of International Search Report).

(Continued)

*Primary Examiner* — Octavia Hollington
(74) *Attorney, Agent, or Firm* — Amster, Rothstein & Ebenstein LLP

(57) ABSTRACT

A temperature management apparatus comprising: a temperature management furnace having a space in which an article placed and for which temperature management is carried out; rod members that include magnetic material; opposing members that respectively oppose portions of the lateral sides of the rod members and include magnetic material; drive apparatuses, which rotates the rod members around the central axis axes thereof and changes the relative positions of the rod members and the respective opposing members; and a coupling degradation monitoring unit 301 for predicting or detecting degradation in the respective coupling between the rod members and the respective opposing members.

4 Claims, 11 Drawing Sheets

(51) Int. Cl.
*G01B 21/00* (2006.01)
*G01L 3/00* (2006.01)

(58) Field of Classification Search
USPC .................................................. 73/862.191
See application file for complete search history.

(56) References Cited

U.S. PATENT DOCUMENTS

| | | | |
|---|---|---|---|
| 5,913,401 A | 6/1999 | Tamura et al. | |
| 6,561,343 B2 * | 5/2003 | Miyauchi | H01L 21/67709 |
| | | | 198/619 |
| 10,336,560 B2 * | 7/2019 | Beppu | F16H 25/24 |
| 10,384,888 B2 * | 8/2019 | Beppu | B65G 47/82 |
| 10,625,949 B2 * | 4/2020 | Beppu | B65G 25/04 |
| 2017/0225912 A1 | 8/2017 | Beppu et al. | |

FOREIGN PATENT DOCUMENTS

| | | | |
|---|---|---|---|
| JP | 3461313 B2 * | 10/2003 | |
| JP | 2016-090075 A | 5/2016 | |

OTHER PUBLICATIONS

Tadahiko Shinshi et al., "Start-up Characteristics and Positioning Accuracy of Magnetic Lead Screw Mechanism," J-STAGE, 1998, vol. 64, Issue 625, pp. 3637-3643.
European Patent Office, "Extended European Search Report," issued in European Patent Application No. 17 827 258.9, which is a European Counterpart of U.S. Appl. No. 16/316,547 dated Jan. 3, 2020, 8 page.

* cited by examiner

TRANSFER APPARATUS

This application is a National Stage entry under 35 U.S.C. 371 of International Patent Application No. PCT/JP2017/019631, filed on May 25, 2017, which claims priority from International Patent Application No. PCT/JP2016/070619, filed Jul. 12, 2016, the entire contents of each of which are incorporated by reference herein.

TECHNICAL FIELD

The present invention relates to a transfer technique.

BACKGROUND ART

Since magnetic screws are driven by non-contact coupling using a magnetic force, application of an overload easily tends to cause a synchronization loss between a male magnetic screw and a female magnetic screw. When a synchronization loss is caused in magnetic screws in which a male magnetic screw is rotationally driven, a deviation occurs in coupling between a rotation command for the male magnetic screw and the actual movement position of a female magnetic screw that is a nut and synchronous driving may be disabled. In this case, a positioning failure or an overrun of the nut may be caused. Therefore, it is preferable to predict or detect a synchronization loss when using magnetic screws. PTL 1 discloses a device that detects changes in a magnetic flux due to a synchronization loss by installing a magnetic sensor on a nut.

CITATION LIST

Patent Literature

PTL 1: Japanese Patent No. 3610209

SUMMARY OF INVENTION

Technical Problem

One object of the invention is to provide a transfer apparatus capable of predicting or detecting a synchronization loss without detecting changes in a magnetic flux with a magnetic sensor.

Solution to Problem

According to an aspect of the invention, there is provided a temperature management apparatus comprising (a) a temperature-controlled furnace that has a temperature-controlled space in which an article is disposed, (b) a rod-shaped member that comprises a magnetic material; (c) an opposite member that is opposed to a part of a side surface of the rod-shaped member and comprises a magnetic material; (d) a driving device configured to rotate the rod-shaped member or the opposite member about a central axis of the rod-shaped member to change a relative position between the rod-shaped member and the opposite member; and (e) a synchronization loss monitoring portion configured to predict or detect a synchronization loss between the rod-shaped member and the opposite member based on a fluctuation of a torque of the driving device.

The temperature management apparatus described above may further comprise a controlling portion configured to control the driving device when the synchronization loss has been predicted or detected.

In the temperature management apparatus described above, the synchronization loss monitoring portion may be configured to detect the fluctuation of the torque based on a fluctuation of a driving current for the driving device.

In the temperature management apparatus described above, the synchronization loss monitoring portion may be configured to differentiate a measurement value representing the torque. Alternatively, the synchronization loss monitoring portion may be configured to integrate a measurement value representing the torque.

In the temperature management apparatus described above, the driving device may be configured to rotate the rod-shaped member about the central axis of the rod-shaped member and the synchronization loss monitoring portion may be configured to calculate a load applied to the opposite member based on a difference between an external force applied to the opposite member by the driving device via the rod-shaped member and a force required to move the opposite member when no load is applied to the opposite member and predict or detect the synchronization loss based on the calculated load.

In the temperature management apparatus described above, the external force applied to the opposite member by the driving device via the rod-shaped member may be calculated based on the torque of the driving device.

In the temperature management apparatus described above, the force required to move the opposite member when no load is applied to the opposite member may be calculated based on a position of the opposite member.

In the temperature management apparatus described above, the synchronization loss monitoring portion may be configured to predict or detect the synchronization loss by comparing a maximum value of a thrust force generated by a magnetic coupling between the rod-shaped member and the opposite member with the load.

The temperature management apparatus described above may further comprise a memory device that stores a relationship between the position of the opposite member and the maximum value of the thrust force.

In the temperature management apparatus described above, the synchronization loss monitoring portion may be configured to compare a difference between a reference value representing the torque of the driving device and a measurement value representing the torque of the driving device with a predetermined threshold.

In the temperature management apparatus described above, the difference between the reference value representing the torque of the driving device and the measurement value representing the torque of the driving device may be an average value.

In the temperature management apparatus described above, the synchronization loss monitoring portion may be configured to determine the number of times the difference between the reference value representing the torque of the driving device and the measurement value representing the torque of the driving device has exceeded the predetermined threshold to be the number of times the synchronization loss has occurred.

The temperature management apparatus described above may further comprise a contact member configured to move within the temperature-controlled furnace with a change in the relative position between the rod-shaped member and the opposite member and moves an article by making contact with the article.

In the temperature management apparatus described above, the driving device may be disposed outside the temperature-controlled space.

In the temperature management apparatus described above, when the driving device rotates the rod-shaped member, the opposite member may move along the central axis of the rod-shaped member and the contact member fixed to the opposite member may move. In this case, the rod-shaped member, the opposite member, and the contact member may be disposed in the temperature-controlled space. The temperature management apparatus described above may further comprise a mandrel that penetrates through a side wall of the temperature-controlled furnace and makes connection between the rod-shaped member and the driving device. In addition, the temperature management apparatus may further comprise a sealing member provided in a hole of the side wall of the temperature-controlled furnace through which the mandrel penetrates.

In the temperature management apparatus described above, when the driving device rotates the opposite member, the rod-shaped member may move in a direction of the central axis and the contact member fixed to the rod-shaped member may move. In this case, the contact member may be disposed in the temperature-controlled space and the opposite member may be disposed outside the temperature-controlled space. The rod-shaped member may penetrate through the side wall of the temperature-controlled furnace. The temperature management apparatus may further comprise a sealing member provided in a hole of the side wall of the temperature-controlled furnace through which the rod-shaped member penetrates.

In the temperature management apparatus described above, the temperature-controlled furnace may be a freeze drying furnace. The article may include a medicine.

According to an aspect of the invention, there is provided a transfer apparatus comprising (a) a rod-shaped member that comprises a magnetic material; (b) an opposite member that is opposed to a part of a side surface of the rod-shaped member and comprises a magnetic material; (c) a driving device configured to rotate the rod-shaped member or the opposite member about a central axis of the rod-shaped member to change a relative position between the rod-shaped member and the opposite member; and (d) a synchronization loss monitoring portion configured to predict or detect a synchronization loss between the rod-shaped member and the opposite member based on a fluctuation of a torque of the driving device.

The transfer apparatus described above may further comprise a controlling portion configured to control the driving device when the synchronization loss has been predicted or detected.

In the transfer apparatus described above, the synchronization loss monitoring portion may be configured to detect the fluctuation of the torque based on a fluctuation of a driving current for the driving device.

In the transfer apparatus described above, the synchronization loss monitoring portion may be configured to differentiate a measurement value representing the torque. Alternatively, the synchronization loss monitoring portion may be configured to integrate a measurement value representing the torque.

In the transfer apparatus described above, when the driving device rotates the rod-shaped member, the opposite member may move along the central axis of the rod-shaped member. Alternatively, when the driving device rotates the opposite member, the rod-shaped member may move in a direction of the central axis.

In the transfer apparatus described above, the driving device may be configured to rotate the rod-shaped member about the central axis of the rod-shaped member and the synchronization loss monitoring portion may be configured to calculate a load applied to the opposite member based on a difference between an external force applied to the opposite member by the driving device via the rod-shaped member and a force required to move the opposite member when no load is applied to the opposite member and predict or detect the synchronization loss based on the calculated load.

In the transfer apparatus described above, the external force applied to the opposite member by the driving device via the rod-shaped member may be calculated based on the torque of the driving device.

In the transfer apparatus described above, the force required to move the opposite member when no load is applied to the opposite member may be calculated based on a position of the opposite member.

In the transfer apparatus described above, the synchronization loss monitoring portion may be configured to predict or detect the synchronization loss by comparing a maximum value of a thrust force generated by a magnetic coupling between the rod-shaped member and the opposite member with the load.

The transfer apparatus described above may further comprise a memory device configured to store a relationship between the position of the opposite member and the maximum value of the thrust force.

In the transfer apparatus described above, the synchronization loss monitoring portion may be configured to compare a difference between a reference value representing the torque of the driving device and a measurement value representing the torque of the driving device with a predetermined threshold.

In the transfer apparatus described above, the difference between the reference value representing the torque of the driving device and the measurement value representing the torque of the driving device may be an average value.

In the transfer apparatus described above, the synchronization loss monitoring portion may be configured to determine the number of times the difference between the reference value representing the torque of the driving device and the measurement value representing the torque of the driving device has exceeded the predetermined threshold to be the number of times the synchronization loss has occurred.

Advantageous Effects of Invention

According to the invention, it is possible to provide a transfer apparatus capable of predicting or detecting a synchronization loss without detecting a change in a magnetic flux with a magnetic sensor.

DESCRIPTION OF EMBODIMENTS

Figure 1:
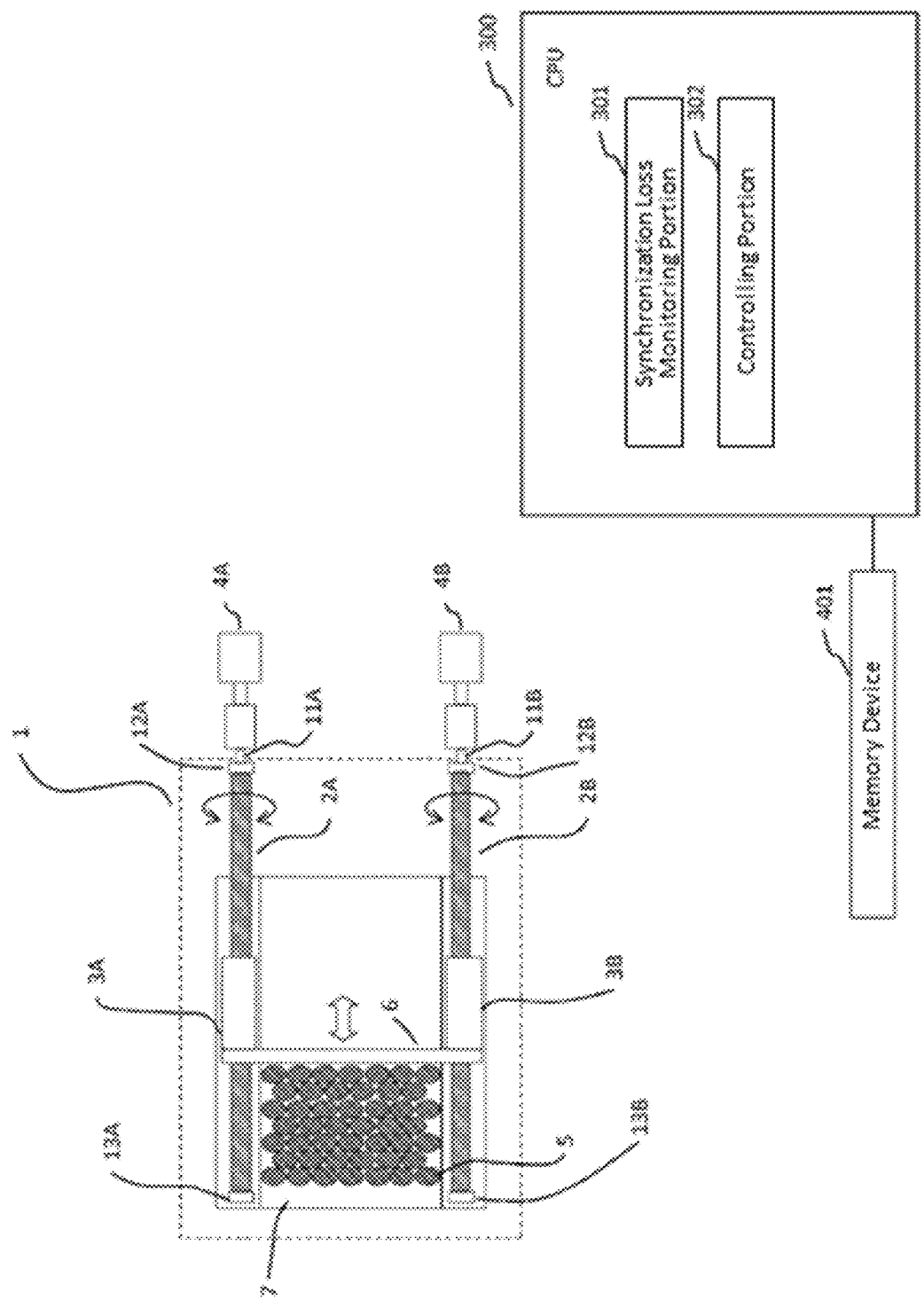
FIG. 1 is a schematic view illustrating a temperature management apparatus according to a first embodiment.

Embodiments of the invention will be described below. In the description of the drawings given below, the same or similar parts are denoted by the same or similar reference numerals. However, the drawings are illustrated schematically. Accordingly, specific dimensions and the like should be decided with reference to the following description. It will be appreciated that the relationship or the ratio between dimensions may be different among the drawings.

First Embodiment

As illustrated in FIG. 1, a temperature management apparatus according to a first embodiment comprises a temperature-controlled furnace 1 that has a temperature-controlled space in which an article 5 is disposed, rod-shaped members 2A and 2B that comprise magnetic materials, opposite members 3A and 3B that are opposed to parts of side surfaces of the rod-shaped members 2A and 2B, respectively, and comprise magnetic materials, a driving device 4A that rotates the rod-shaped member 2A about a central axis to change a relative position between the rod-shaped member 2A and the opposite member 3A, a driving device 4B that rotates the rod-shaped member 2B about a central axis to change a relative position between the rod-shaped member 2B and the opposite member 3B, and a synchronization loss monitoring portion 301 that predicts or detects synchronization losses of the rod-shaped members 2A and 2B and the opposite members 3A and 3B, respectively, based on fluctuations of torques of the driving devices 4A and 4B. The synchronization loss monitoring portion 301 is comprised in, for example, a central processing unit (CPU) 300.

The temperature-controlled furnace 1 is, for example, a freeze drying furnace. For example, a shelf board 7 is disposed in the temperature-controlled furnace 1 and the article 5 comprising an object to be freeze-dried is disposed on the shelf board 7. The article 5 is, for example, a vial into which a medicine has been poured.

Figure 2:
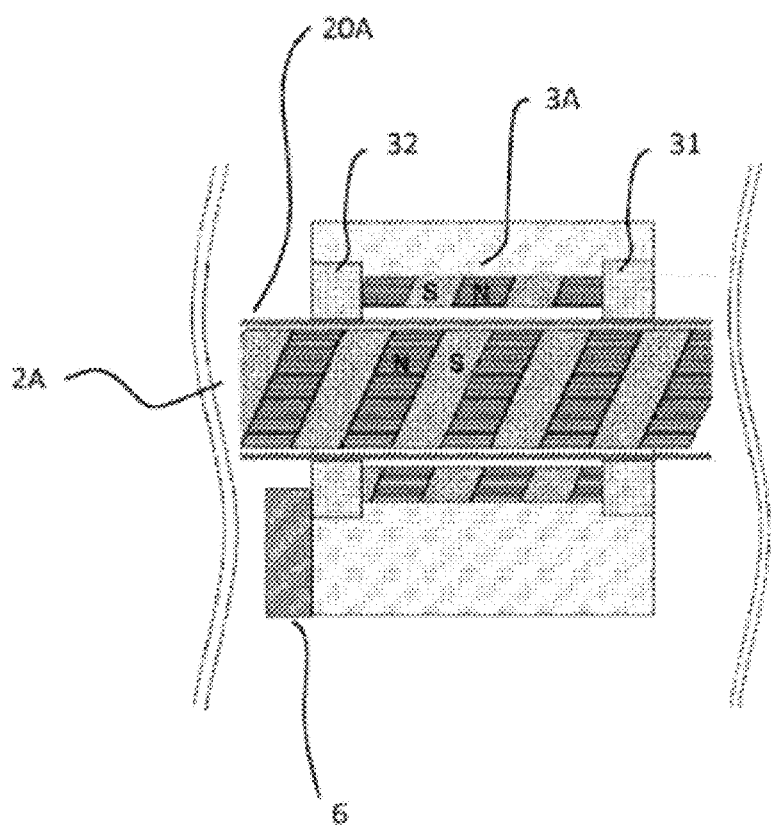
FIG. 2 is a schematic view illustrating a rod-shaped member and an opposite member according to the first embodiment.

The cylindrical rod-shaped member 2A is held in the temperature-controlled furnace 1 by bearings 12A and 13A. As illustrated in FIG. 2, the rod-shaped member 2A is a magnetic screw comprising a hard magnetic material, and S pole magnetized zones and N pole magnetized zones are alternately provided on an outer peripheral surface thereof in a spiral shape. The rod-shaped member 2A may be inserted into a thin-walled pipe 20A made of a nonmagnetic material. The pipe 20A is made of, for example, stainless steel. The rod-shaped member 2A and the pipe 20A are integrated with each other and, when the rod-shaped member 2A rotates, the pipe 20A also rotates about the central axis of the rod-shaped member 2A.

The opposite member 3A held in the temperature-controlled furnace 1 is a magnetic nut comprising a hard magnetic material and is provided with a hole having an inner circumference larger than an outer circumference of the rod-shaped member 2A. The rod-shaped member 2A penetrates through the hole of the nut-shaped opposite member 3A. S pole magnetized zones and N pole magnetized zones are alternately provided in a spiral shape on an inner peripheral surface of the hole of the opposite member 3A. The pitch of the magnetized zones in the opposite member 3A is substantially the same as the pitch of the magnetized zones in the rod-shaped member 2A. Guide rings 31 and 32, such as bushes, may be disposed on an inner peripheral surface of the opposite member 3A. The inner circumferences of the guide rings 31 and 32 are smaller than the inner circumference of the opposite member 3A and make contact with an outer peripheral surface of the pipe 20A. As a result, a constant interval is kept between the magnetized zones of the rod-shaped member 2A and the magnetized zones of the opposite member 3A. The guide rings 31 and 32 are made of materials having a small friction coefficient, such as fluororesin.

As illustrated in FIG. 1, the cylindrical rod-shaped member 2B is held in parallel with the rod-shaped member 2A by bearings 12B and 13B in the temperature-controlled furnace 1. The structure of the rod-shaped member 2B is the same as that of the rod-shaped member 2A. The structure of the opposite member 3B held in the temperature-controlled furnace 1 is the same as that of the opposite member 3A.

The temperature management apparatus further comprises a contact member 6 that moves within the temperature-controlled furnace 1 with changes in the relative positions between, for example, the rod-shaped members 2A and 2B and the opposite members 3A and 3B and moves the article 5 by making contact with the article 5. The contact member 6 held in the temperature-controlled furnace 1 is a plate member and is fixed between the opposite member 3A and the opposite member 3B so as to be substantially perpendicular to a surface of the shelf board 7.

The driving devices 4A and 4B comprise rotating motors and are disposed outside the temperature-controlled space of the temperature-controlled furnace 1. The driving devices 4A and 4B may be disposed outside the casing of the temperature-controlled furnace 1 or may be disposed outside the temperature-controlled space in the casing of the temperature-controlled furnace 1. The driving devices 4A and 4B may be covered with a shield or the like that prevents diffusion of dust that may be generated or the like. The driving device 4A and the rod-shaped member 2A are connected to each other via, for example, a mandrel 11A that penetrates through a side wall of the temperature-controlled furnace 1. The disposition of the driving device 4A is fixed and the rod-shaped member 2A connected to the driving device 4A cannot move in the direction of the central axis thereof. In addition, the driving device 4B and the rod-shaped member 2B are connected to each other via, for example, a mandrel 11B that penetrates through the side wall of the temperature-controlled furnace 1. The disposition of the driving device 4B is fixed and the rod-shaped member 2B connected to the driving device 4B cannot move in the direction of the central axis thereof. Holes of the side wall of the temperature-controlled furnace 1 through which the mandrels 11A and 11B penetrate are provided with sealing members such as, for example, oil seals.

The driving devices 4A and 4B rotate the rod-shaped members 2A and 2B in synchronization with each other. When the driving device 4A rotates the rod-shaped member 2A, a magnetic force acts between the magnetized zones of the rod-shaped member 2A and the magnetized zones of the opposite member 3A. The opposite member 3A is fixed to the contact member 6 and the opposite member 3B and cannot rotate. Therefore, when the rod-shaped member 2A is rotated, the opposite member 3A moves along the central axis of the rod-shaped member 2A. When the driving device 4B rotates the rod-shaped member 2B, a magnetic force acts between the magnetized zones of the rod-shaped member 2B and the magnetized zones of the opposite member 3B and the opposite member 3B moves along the central axis of the rod-shaped member 2B. The contact member 6 fixed between the opposite members 3A and 3B also moves along the central axes of the rod-shaped members 2A and 2B with the movement of the opposite members 3A and 3B on the shelf board 7. The article 5 disposed on the shelf board 7 moves on the shelf board 7 by being pushed by the contact member 6. Furthermore, the article 5 may be pushed from the door of the temperature-controlled furnace 1 to the outside of the temperature-controlled furnace 1.

Figure 3:
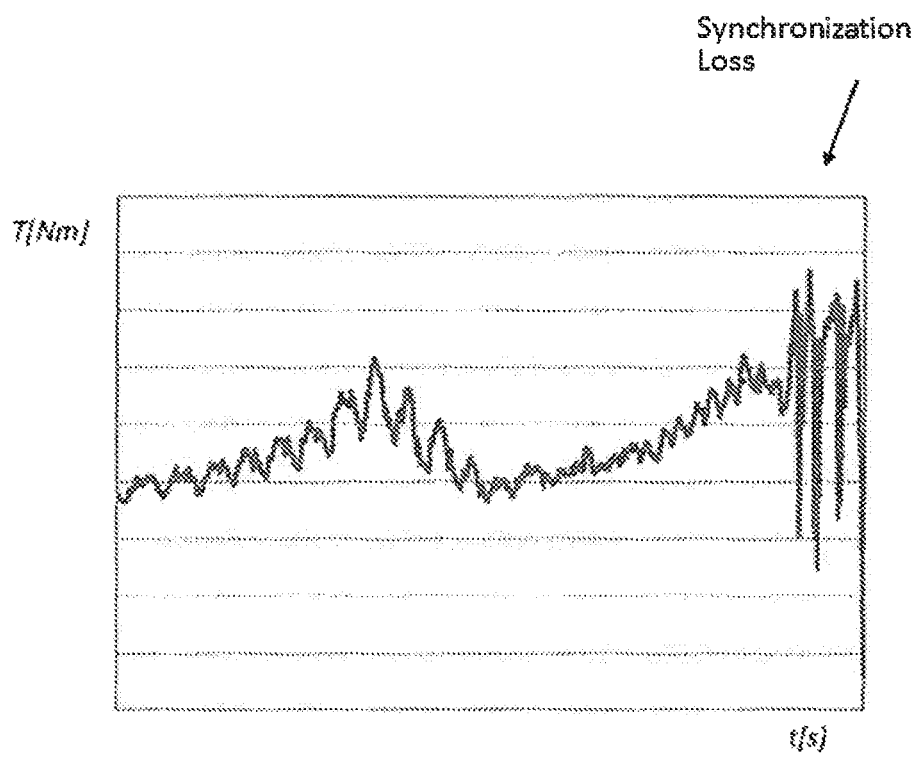
FIG. 3 is a graph illustrating temporal changes of a torque according to the first embodiment.

Here, when a synchronization loss of the opposite member 3A with respect to the rod-shaped member 2A occurs or almost occurs, the torque of the driving device 4A is reduced and the driving current for the driving device 4A is reduced as illustrated in FIG. 3. In addition, when a synchronization loss of the opposite member 3B with respect to the rod-shaped member 2B illustrated in FIG. 1 occurs or almost occurs, the torque of the driving device 4B is reduced and the driving current for the driving device 4B is reduced. Since the driving current has a correlation with the torque, the measurement value of the driving current can be used as a measurement value representing the torque. The synchronization loss monitoring portion 301 detects fluctuations in the torques based on changes in the driving currents for the driving devices 4A and 4B with respect to the time axis. It should be noted here that the synchronization loss monitoring portion 301 may monitor fluctuations in the driving currents for the driving devices 4A and 4B by monitoring the driving voltages for the driving devices 4A and 4B.

The synchronization loss monitoring portion 301 predicts that a synchronization loss of the opposite member 3A with respect to the rod-shaped member 2A possibly occurs when, for example, the driving current for the driving device 4A is equal to or less than a first current threshold. In addition, the synchronization loss monitoring portion 301 decides that a synchronization loss of the opposite member 3A with respect to the rod-shaped member 2A has occurred when the driving current for the driving device 4A is equal to or less than a second current threshold that is less than the first current threshold. Similarly, the synchronization loss monitoring portion 301 predicts that a synchronization loss of the opposite member 3B with respect to the rod-shaped member 2B possibly occurs when the driving current for the driving device 4B is equal to or less than the first current threshold. In addition, the synchronization loss monitoring portion 301 decides that a synchronization loss of the opposite member 3B with respect to the rod-shaped member 2B has occurred when the driving current for the driving device 4B is equal to or less than the second current threshold.

It should be noted here that the synchronization loss monitoring portion 301 may calculate the torques based on the driving currents for the driving devices 4A and 4B. In this case, the synchronization loss monitoring portion 301 predicts that a synchronization loss of the opposite member 3A with respect to the rod-shaped member 2A possibly occurs when the torque of the driving device 4A is equal to or less than a first torque threshold. In addition, the synchronization loss monitoring portion 301 decides that a synchronization loss of the opposite member 3A with respect to the rod-shaped member 2A has occurred when the torque of the driving device 4A is equal to or less than a second torque threshold that is less than the first torque threshold. Similarly, the synchronization loss monitoring portion 301 predicts that a synchronization loss of the opposite member 3B with respect to the rod-shaped member 2B possibly occurs when the torque of the driving device 4B is equal to or less than the first torque threshold. In addition, the synchronization loss monitoring portion 301 decides that a synchronization loss of the opposite member 3B with respect to the rod-shaped member 2B has occurred when the torque of the driving device 4B is equal to or less than the second torque threshold.

Figure 4:
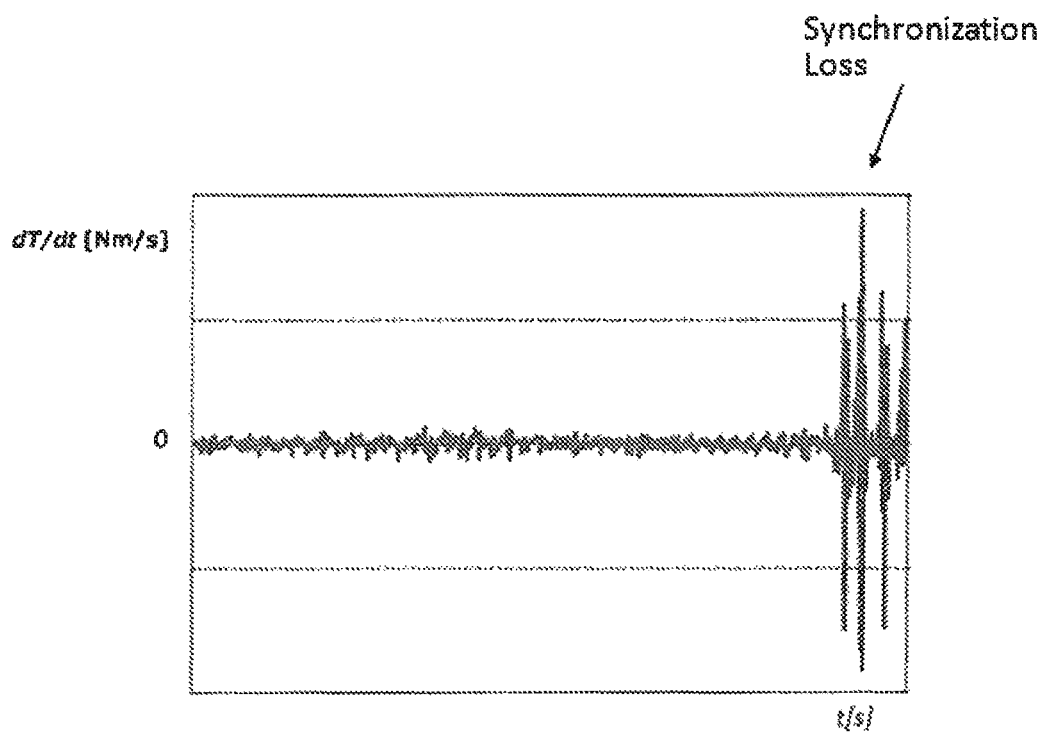
FIG. 4 is a graph illustrating temporal changes of a derivative value of the torque according to the first embodiment.

In addition, the synchronization loss monitoring portion 301 may calculate a torque derivative value by differentiating measurement values representing the torques of the driving devices 4A and 4B by time and may predict or detect a synchronization loss based on the waveform of the torque derivative value on the time axis or the like. When a synchronization loss occurs, the torques of the driving devices 4A and 4B are reduced suddenly and then returned to the original torques. Therefore, as illustrated in FIG. 4, the torque derivative value is substantially constant with respect to the time axis when a synchronization loss does not occur, but the torque derivative value is reduced, reaches a negative peak, is increased, and reaches a positive peak with respect to the time axis when a synchronization loss occurs.

Accordingly, the synchronization loss monitoring portion 301 illustrated in FIG. 1 predicts that a synchronization loss of the opposite member 3A with respect to the rod-shaped member 2A possibly occurs when the torque derivative value of the driving device 4A becomes equal to or less than a first negative derivative threshold and then becomes equal to or more than a first positive derivative threshold within a predetermined time range. In addition, the synchronization loss monitoring portion 301 decides that a synchronization loss of the opposite member 3A with respect to the rod-shaped member 2A has occurred when the torque derivative value of the driving device 4A becomes equal to or less than a second negative derivative threshold that is less than the first negative derivative threshold and then becomes equal to or more than a second positive derivative threshold that is more than the first positive derivative threshold.

Similarly, the synchronization loss monitoring portion 301 predicts that a synchronization loss of the opposite member 3B with respect to the rod-shaped member 2B possibly occurs when the torque derivative value of the driving device 4B becomes equal to or less than the first negative derivative threshold and then becomes equal to or more than the first positive derivative threshold within a predetermined time range. In addition, the synchronization loss monitoring portion 301 decides that a synchronization loss of the opposite member 3B with respect to the rod-shaped member 2B has occurred when the torque derivative value of the driving device 4B becomes equal to or less than the second negative derivative threshold and then becomes equal to or more than the second positive derivative threshold.

Alternatively, the synchronization loss monitoring portion 301 may calculate a torque integral value by integrating measurement values representing the torques of the driving devices 4A and 4B by time and may predict or detect a synchronization loss based on the waveform of the torque integral value on the time axis or the like. The torque integral value is substantially constant with respect to the time axis when a synchronization loss does not occur, but the torque integral value is increased and reaches a positive peak with respect to the time axis when a synchronization loss occurs.

Accordingly, the synchronization loss monitoring portion 301 predicts that a synchronization loss of the opposite member 3A with respect to the rod-shaped member 2A possibly occurs when the torque integral value of the driving device 4A is equal to or more than a first integral threshold. In addition, the synchronization loss monitoring portion 301 decides that a synchronization loss of the opposite member 3A with respect to the rod-shaped member 2A has occurred when the torque integral value of the driving device 4A is equal to or more than a second torque integral threshold that is more than the first torque integral threshold.

Similarly, the synchronization loss monitoring portion 301 predicts that a synchronization loss of the opposite member 3B with respect to the rod-shaped member 2B possibly occurs when the torque integral value of the driving device 4B is equal to or less than the first integral threshold. In addition, the synchronization loss monitoring portion 301 decides that a synchronization loss of the opposite member 3B with respect to the rod-shaped member 2B has occurred when the torque integral value of the driving device 4B is equal to or more than the second integral threshold.

It should be noted here that the torques become small immediately after the driving devices 4A and 4B start rotation and immediately before the driving devices 4A and 4B stop even when a synchronization loss does not occur. Therefore, the synchronization loss monitoring portion 301 does not need to decide the occurrence of a synchronization loss immediately after the driving devices 4A and 4B start rotation and immediately before the driving devices 4A and 4B stop.

The CPU 300 further comprises a controlling portion 302 that controls the driving devices 4A and 4B. For example, when the synchronization loss monitoring portion 301 has predicted or detected a synchronization loss, the controlling portion 302 stops the driving devices 4A and 4B.

For example, a memory device 401 is connected to the CPU 300. The memory device 401 stores the first and second current thresholds, the first and second torque thresholds, the first and second positive derivative thresholds, the first and second negative derivative thresholds, or the first and second integral thresholds. The synchronization loss monitoring portion 301 reads first and second thresholds from the memory device 401. The first and second thresholds are set to predetermined values in advance. In addition, the first and second thresholds may be calculated by a simulation or the like.

In the temperature management apparatus according to the first embodiment described above, a driving force is transmitted between the rod-shaped members 2A and 2B and the opposite members 3A and 3B in a non-contact manner by a magnetic force. Accordingly, when a driving force is transmitted between the rod-shaped members 2A and 2B and the opposite members 3A and 3B, heat and dust are unlikely to be generated. Therefore, even if the rod-shaped members 2A and 2B and the opposite members 3A and 3B are disposed in the temperature-controlled space of the temperature-controlled furnace 1, an influence of heat generation in the temperature-controlled space can be suppressed and the temperature-controlled space can be kept clean.

Furthermore, since the driving devices 4A and 4B are disposed outside the temperature-controlled space of the temperature-controlled furnace 1, even if dust is generated in the driving devices 4A and 4B, the dust is unlikely to enter the temperature-controlled space of the temperature-controlled furnace 1. In addition, if the driving devices are disposed inside the temperature-controlled furnace, a temperature distribution may become uneven inside the temperature-controlled furnace, such as a freeze drying furnace, due to the heated driving device. In this case, the quality of a plurality of articles disposed in the temperature-controlled furnace may become uneven. In contrast, in the temperature management apparatus according to the first embodiment, since the driving devices 4A and 4B are disposed outside the temperature-controlled space of the temperature-controlled furnace 1, the temperature is unlikely to become uneven inside the temperature-controlled furnace 1.

Furthermore, in the temperature management apparatus according to the first embodiment, when the contact member 6 is moved, the rod-shaped members 2A and 2B do not go out of the temperature-controlled furnace 1. Therefore, no foreign matters are drawn into the temperature-controlled furnace 1 by the rod-shaped members 2A and 2B from the outside of the temperature-controlled furnace 1. Accordingly, the temperature management apparatus according to the first embodiment can keep the inside of the temperature-controlled furnace 1 clean and suppress the temperature unevenness in the temperature-controlled furnace 1.

In addition, the temperature management apparatus according to the first embodiment can predict or detect synchronization losses of the rod-shaped members 2A and 2B and the opposite members 3A and 3B, respectively. Therefore, it is possible to prevent the article 5 from being disposed inaccurately or the device from failing due to a synchronization loss. In addition, the temperature management apparatus according to the first embodiment can detect torques without disposing sensors in the rod-shaped members 2A and 2B and the opposite members 3A and 3B. Therefore, it is possible to dispose the rod-shaped members 2A and 2B and the opposite members 3A and 3B in an environment in which temperature change unendurable for sensors is caused or dispose the rod-shaped members 2A and 2B and the opposite members 3A and 3B in an environment in which cleaning with chemical agents unendurable for sensors is performed.

Modifications of the First Embodiment

Figure 5:
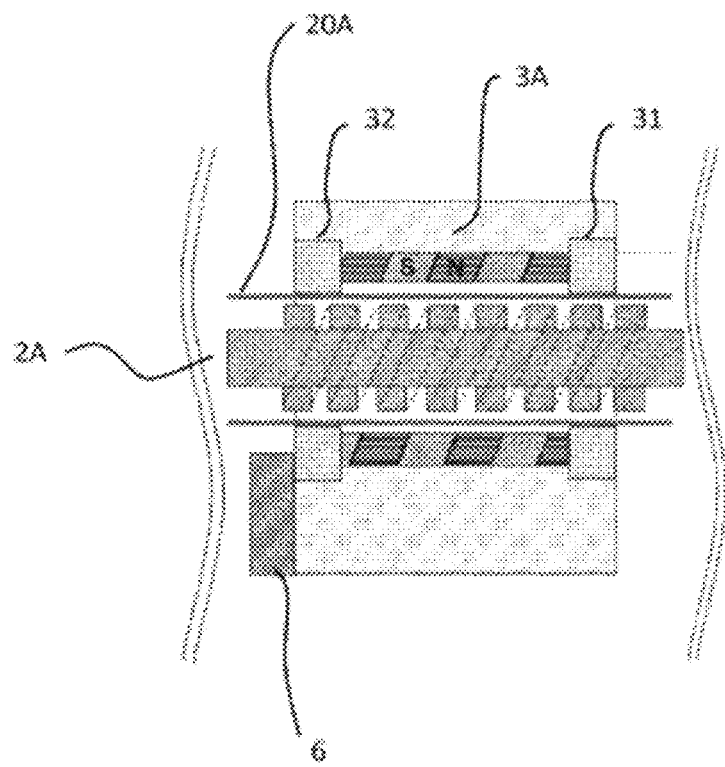
FIG. 5 is a schematic view illustrating a rod-shaped member and an opposite member according to a modification of the first embodiment.

The structures of the rod-shaped member 2A and the opposite member 3A are not limited to the example illustrated in FIG. 2. For example, as illustrated in FIG. 5, the rod-shaped member 2A may be formed of a threaded soft magnetic material. The structure of the opposite member 3A is the same as that in FIG. 2. The pitch of the threads of the rod-shaped member 2A illustrated in FIG. 5 is substantially the same as the pitch of the magnetized zones of the opposite member 3A. The threaded rod-shaped member 2A may be inserted into the thin-walled pipe 20A made of a nonmagnetic material. This can prevent foreign matters from adhering to the threaded groove of the rod-shaped member 2A. When the rod-shaped member 2A is rotated, a magnetic force acts between the threads of the rod-shaped member 2A and the magnetized zones of the opposite member 3A, and the opposite member 3A moves.

Figure 6:
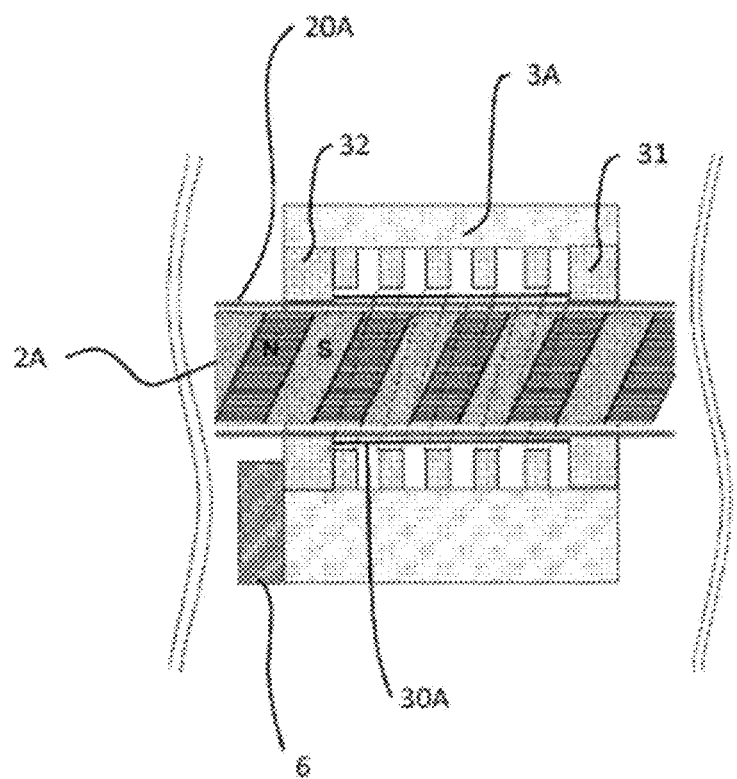
FIG. 6 is a schematic view illustrating a rod-shaped member and an opposite member according to a modification of the first embodiment.

Alternatively, as illustrated in FIG. 6, the opposite member 3A may be formed of a threaded soft magnetic material. The surface of a threaded hole in the opposite member 3A may be covered with a thin-walled pipe 30A made of a nonmagnetic material. This can prevent foreign matters from adhering to the threaded groove of the opposite member 3A. The structure of the rod-shaped member 2A is the same as that in FIG. 2. The pitch of the threads of the opposite member 3A illustrated in FIG. 6 is substantially the same as the pitch of the magnetized zones of the rod-shaped member 2A. When the rod-shaped member 2A is rotated, a magnetic force acts between the magnetized zones of the rod-shaped member 2A and the threads of the opposite member 3A, and the opposite member 3A moves.

The rod-shaped member 2B and the opposite member 3B illustrated in FIG. 1 may also have structures as illustrated in FIG. 5 or 6.

Second Embodiment

Figure 7:
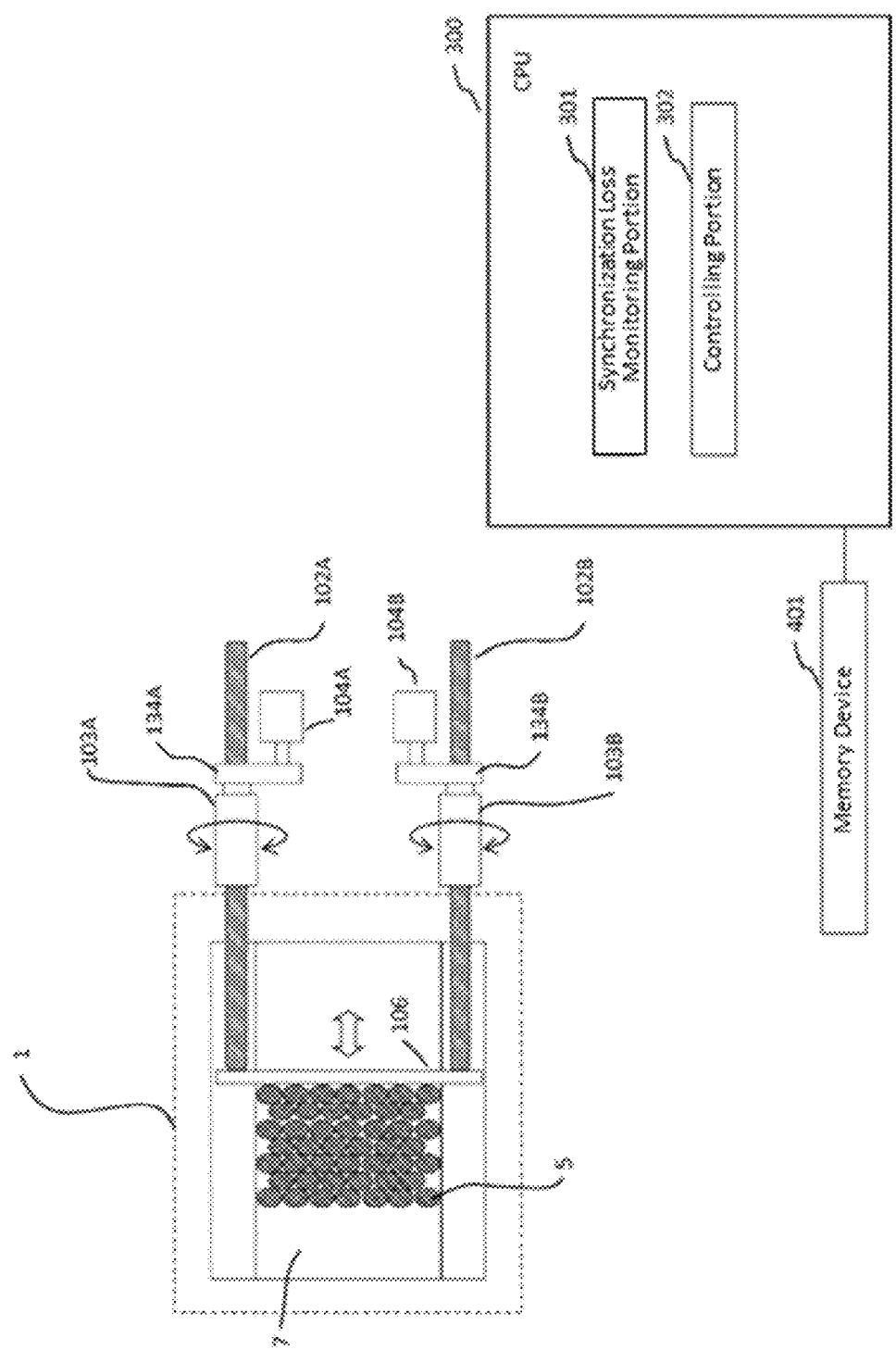
FIG. 7 is a schematic view illustrating a temperature management apparatus according to a second embodiment.

As illustrated in FIG. 7, a temperature management apparatus according to a second embodiment comprises a temperature-controlled furnace 1 in which an article 5 is stored, rod-shaped members 102A and 102B that comprise magnetic materials, opposite members 103A and 103B that are opposed to parts of side surfaces of the rod-shaped members 102A and 102B, respectively, and comprise magnetic materials, a driving device 104A that rotates the opposite member 103A about a central axis of the rod-shaped member 102A to change a relative position between the rod-shaped member 102A and the opposite member 103A, a driving device 104B that rotates the opposite member 103B about a central axis of the rod-shaped member 102B to change a relative position between the rod-shaped member 102B and the opposite member 103B, and a synchronization loss monitoring portion 301 that predicts or detects synchronization losses of the rod-shaped members 102A and 102B and the opposite members 103A and 103B, respectively, based on fluctuations of torques of the driving devices 104A and 104B.

The driving device 104A disposed outside a temperature-controlled space of the temperature-controlled furnace 1 rotates the opposite member 103A disposed outside the temperature-controlled space of the temperature-controlled furnace 1 via a belt 134A or the like. The disposition of the driving device 104A is fixed and the opposite member 103A cannot move in a direction of the central axis of the rod-shaped member 102A. The driving device 104B disposed outside the temperature-controlled space of the temperature control furnace 1 rotates the opposite member 103B disposed outside the temperature-controlled space of the temperature-controlled furnace 1 via a belt 134B or the like. The disposition of the driving device 104B is fixed and the opposite member 103B cannot move in the direction of the central axis of the rod-shaped member 102B. The driving devices 104A and 104B and the belts 134A and 134B may be covered with a shield or the like that prevents diffusion of dust that may be generated or the like.

The rod-shaped members 102A and 102B are held so as to be movable in the directions of the central axes thereof. In the temperature-controlled furnace 1, a contact member 106 is fixed to end portions of the rod-shaped members 102A and 102B. The rod-shaped members 102A and 102B project to the outside of the temperature-controlled furnace 1 through a side wall of the temperature-controlled furnace 1. Holes of the side wall of the temperature-controlled furnace 1 through which the rod-shaped members 102A and 102B penetrate are provided with sealing members such as, for example, oil seals. The parts of the rod-shaped members 102A and 102B projecting to the outside of the temperature-controlled furnace 1 penetrate through holes of the nut-shaped opposite members 103A and 103B. Since the rod-shaped members 102A and 102B are fixed to the contact member 106, the rod-shaped members 102A and 102B cannot rotate about the central axes thereof.

The driving devices 104A and 104B synchronously rotate the opposite members 103A and 103B. When the driving device 104A rotates the opposite member 103A, the rod-shaped member 102A is moved along the central axis thereof by a magnetic force. When the driving device 104B rotates the opposite member 103B, the rod-shaped member 102B is moved along the central axis thereof by a magnetic force. The contact member 106 fixed between the rod-shaped members 102A and 102B also moves on a shelf board 7 along the central axes of the rod-shaped members 102A and 102B with the movement of the rod-shaped members 102A and 102B. The article 5 disposed on the shelf board 7 moves on the shelf board 7 by being pushed by the contact member 106.

The synchronization loss monitoring portion 301 predicts or detects a synchronization loss as in the first embodiment. When the synchronization loss monitoring portion 301 has predicted or detected a synchronization loss, a controlling portion 302 stops the driving devices 104A and 104B.

In the temperature management apparatus according to the second embodiment described above, a driving force is transmitted between the rod-shaped members 102A and 102B and the opposite members 103A and 103B in a non-contact manner by a magnetic force. Accordingly, when a driving force is transmitted between the rod-shaped members 102A and 102B and the opposite members 103A and 103B, heat and dust are unlikely to be generated. Therefore, even when the rod-shaped members 102A and 102B and the opposite members 103A and 103B are disposed in, for example, a clean room, the influence of heat generation in the clean room can be suppressed and the clean room can be kept clean.

In addition, since the driving devices 104A and 104B are disposed outside the temperature-controlled space of the temperature-controlled furnace 1, even if dust is generated in the driving devices 104A and 104B, the dust is unlikely to enter the temperature-controlled space of the temperature-controlled furnace 1. In addition, since the driving devices 104A and 104B are disposed outside the temperature-controlled space of the temperature-controlled furnace 1, the temperature is unlikely to become uneven inside the temperature-controlled furnace 1. Furthermore, in the temperature management apparatus according to the second embodiment, since the rod-shaped members 102A and 102B do not rotate, there is no need to install the bearings and the like in the temperature-controlled furnace 1. Accordingly, the temperature management apparatus according to the second embodiment can keep the inside of the temperature-controlled furnace 1 clean and suppress the temperature unevenness in the temperature-controlled furnace 1.

In addition, the temperature management apparatus according to the second embodiment can predict or detect synchronization losses of the rod-shaped members 102A and 102B and the opposite members 103A and 103B, respectively. Therefore, it is possible to prevent the article 5 from being disposed inaccurately or the device from failing due to a synchronization loss. In addition, the temperature management apparatus according to the second embodiment can detect torques without disposing sensors in the rod-shaped members 102A and 102B and the opposite members 103A and 103B. Therefore, it is possible to dispose the rod-shaped members 102A and 102B and the opposite members 103A and 103B in an environment in which temperature change unendurable for sensors is caused or dispose the rod-shaped members 102A and 102B and the opposite members 103A and 103B in an environment in which cleaning with chemical agents unendurable for sensors is performed.

Third Embodiment

Figure 8:
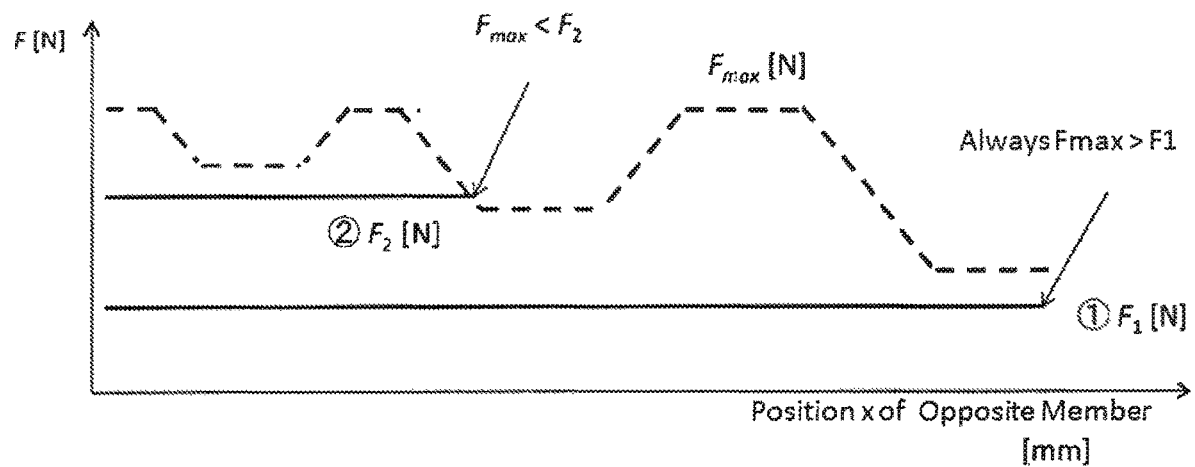
FIG. 8 is a graph illustrating the relationship between a thrust force and a load applied to an opposite member according to a third embodiment.

A temperature management apparatus according to a third embodiment has a structure similar to the temperature management apparatus according to the first embodiment illustrated in FIG. 1. When a load $F_r(N)$ applied to each of the opposite members 3A and 3B exceeds the maximum value (maximum generable thrust force) $F_{max}(N)$ of a thrust force that can be generated by a magnetic coupling, a synchronization loss occurs. For example, when a load $F_1$ is applied to each of the opposite members 3A and 3B and the load $F_1$ is less than the maximum generable thrust force $F_{max}$ in the example illustrated in FIG. 8, a synchronization loss does not occur. However, when a load $F_2$ is applied to each of the opposite members 3A and 3B and the load $F_2$ exceeds the maximum generable thrust force $F_{max}$, a synchronization loss occurs.

Therefore, in the temperature management apparatus according to the third embodiment, the synchronization loss monitoring portion 301 illustrated in FIG. 1 has a logic circuit that monitors the load $F_r$ applied to the opposite member 3A and the maximum generable thrust force $F_{max}$ by a magnetic coupling between the opposite member 3A and the rod-shaped member 2A during operation of the driving device 4A and stops the driving device 4A before the load $F_r$ exceeds the maximum generable thrust force $F_{max}$. The synchronization loss monitoring portion 301 also monitors the combination of the opposite member 3B and the rod-shaped member 2B similarly and stops the driving device 4B before the load $F_r$ exceeds the maximum generable thrust force $F_{max}$. This can prevent a synchronization loss from occurring. Although the combination of the opposite member 3A and the rod-shaped member 2A will be described below, this is also true of the combination of the opposite member 3B and the rod-shaped member 2B.

Figures 9A, 9B:
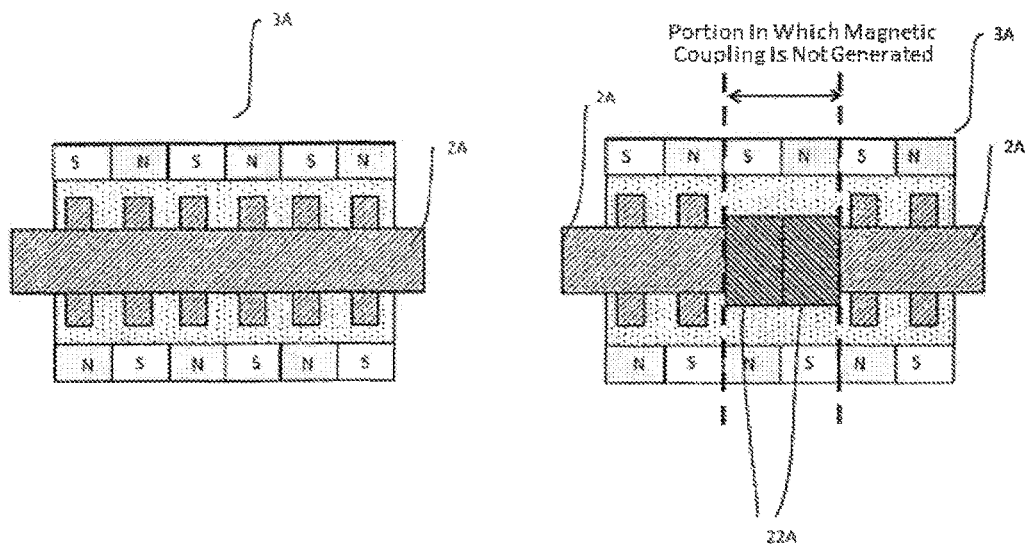
FIGS. 9(a) and 9(b) are schematic views illustrating a rod-shaped member and the opposite member according to the third embodiment.

The number of magnetic couplings generated between the opposite member 3A and the rod-shaped member 2A is proportional to the thrust force. Therefore, the maximum generable thrust force $F_{max}$ can be obtained in advance by an experiment and/or an analysis. For example, in FIG. 9(a), six pairs of S pole and N pole magnetized zones of the opposite member 3A are magnetically coupled to the threads of the rod-shaped member 2A made of a soft magnetic material. In contrast, in FIG. 9(b), since a coupler 22A is provided in the joint of the rod-shaped members 2A, four pairs of S pole and N pole magnetized zones of the opposite member 3A are magnetically coupled with the threads of the rod-shaped members 2A made of a soft magnetic material. Accordingly, the maximum generable thrust force $F_{max}$ in the state illustrated in FIG. 9(b) is smaller than the maximum generable thrust force $F_{max}$ in the state illustrated in FIG. 9(a).

For example, the maximum generable thrust force $F_{max}$ is obtained by expression (1) below based on a thrust force f(N) for each pair of S pole and N pole magnetized zones of the opposite member 3A obtained by an experiment and/or an analysis, the number R of pairs of S pole and N pole magnetized zones coupled to the threads of the rod-shaped member 2A, and a proportional coefficient k. It should be noted here that k is a value other than 1.

$$F_{max} = kRf \qquad (1)$$

The memory device 401 illustrated in FIG. 1 stores the relationship between the position of the opposite member 3A with respect to the rod-shaped member 2A and the maximum generable thrust force $F_{max}$ having been obtained in advance.

Figure 10:
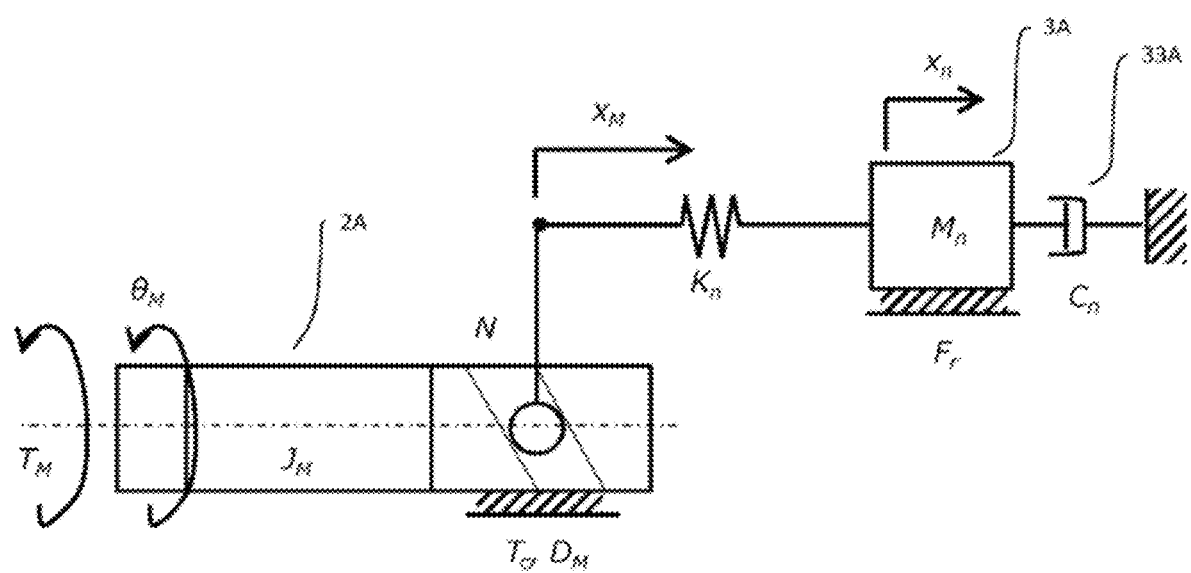
FIG. 10 is a two-inertia system dynamic model of a system comprising a driving device, the rod-shaped member, and the opposite member according to the third embodiment.

For example, when a system comprising the driving device 4A that is a motor, the rod-shaped member 2A that is a rotational shaft, and the opposite member 3A that is a driven body can be modeled as a two-inertia system dynamic model as illustrated in FIG. 10, the dynamic equation of the two-inertia system dynamic model is given by expression (2) below. Although the system is modeled as a two-inertia system dynamic model in the following description, the system may be modeled as a three-inertia system dynamic model or a four-inertia system dynamic model.

[Math. 1]

$$M\ddot{x} + C\dot{x} + Kx = F \qquad (2)$$

The coefficients and variables in expression (2) above are given by expressions (3) to (7) below.

[Math. 2]

$$x = \begin{bmatrix} \theta_M \\ x_n \end{bmatrix} \qquad (3)$$

$$M = \begin{bmatrix} J_M & 0 \\ 0 & M_n \end{bmatrix} \qquad (4)$$

$$C = \begin{bmatrix} D_M & 0 \\ 0 & C_n \end{bmatrix} \qquad (5)$$

$$K = \begin{bmatrix} N^2 K_n & -NK_n \\ -NK_n & K_n \end{bmatrix} \qquad (6)$$

$$F = \begin{bmatrix} T_M - T_C \\ F_r \end{bmatrix} \qquad (7)$$

The symbols in expressions (3) to (7) above will be described below.

$\theta_M$: Rotation angle of driving device 4A (rod-shaped member 2A) (rad)

$x_n$: Displacement of opposite member 3A (m)

$J_M$: Inertial moment of driving device 4A (rod-shaped member 2A) (kg·m²)

$M_n$: Mass of opposite member 3A (kg)

$D_M$: Viscosity friction coefficient of driving device 4A (rod-shaped member 2A) (N·m·s/rad)

$C_n$: Viscosity friction coefficient of guide 33A for guiding opposite member 3A (N·s/m)

N: Rotation to linear motion conversion coefficient (m/rad)

$K_n$: Stiffness in axial direction (N/m)

$T_M$: Torque of driving device 4A (rod-shaped member 2A) (N·m)

$T_C$: Torque applied constantly such as holding torque (N·m)

$F_r$: Load $F_r$ applied to opposite member 3A (N)

For example, expression (2) above can be replaced with the determinant represented by expression (8) below based on expressions (3) to (7) above.

[Math. 3]

$$\begin{bmatrix} J_M & 0 \\ 0 & M_n \end{bmatrix} \begin{bmatrix} \ddot{\theta}_M \\ \ddot{x}_n \end{bmatrix} + \begin{bmatrix} D_M & 0 \\ 0 & C_n \end{bmatrix} \begin{bmatrix} \dot{\theta}_M \\ \dot{x}_n \end{bmatrix} + \begin{bmatrix} N^2 K_n & -NK_n \\ -NK_n & K_n \end{bmatrix} \begin{bmatrix} \theta_M \\ x_n \end{bmatrix} = \begin{bmatrix} T_M - T_C \\ F_r \end{bmatrix} \quad (8)$$

If the determinant indicated by expression (8) above is expanded, expressions (9) and (10) below are obtained. When expressions (9) and (10) are subjected to Laplace transform indication by assuming s to be a complex number, expressions (11) and (12) below are obtained.

[Math. 4]

$$J_M \ddot{\theta}_M + D_M \dot{\theta}_M + N^2 K_n \theta_M - NK_n x_n = T_M - T_C \quad (9)$$

$$M_n \ddot{x}_n + C_n \dot{x}_n - NK_n \theta_M + K_n x_n = F_r \quad (10)$$

$$J_M s^2 \theta_M + D_M s \theta_M + N^2 K_n \theta_M - NK_n x_n = T_M - T_C \quad (11)$$

$$M_n s^2 x_n + C_n s x_n - NK_n \theta_M + K_n x_n = F_r \quad (12)$$

Based on expression (11) above, $s\theta_M$ is given by expression (13) below.

[Math. 5]

$$s\theta_M = \frac{T_M - T_C - NK_n(N\theta_M - x_n)}{J_M s + D_M} \quad (13)$$

Based on expression (12) above, $x_n$ is given by expression (14) below.

[Math. 6]

$$x_n = \frac{F_r + NK_n \theta_M}{M_n s^2 + C_n s + K_n} \quad (14)$$

Figure 11:
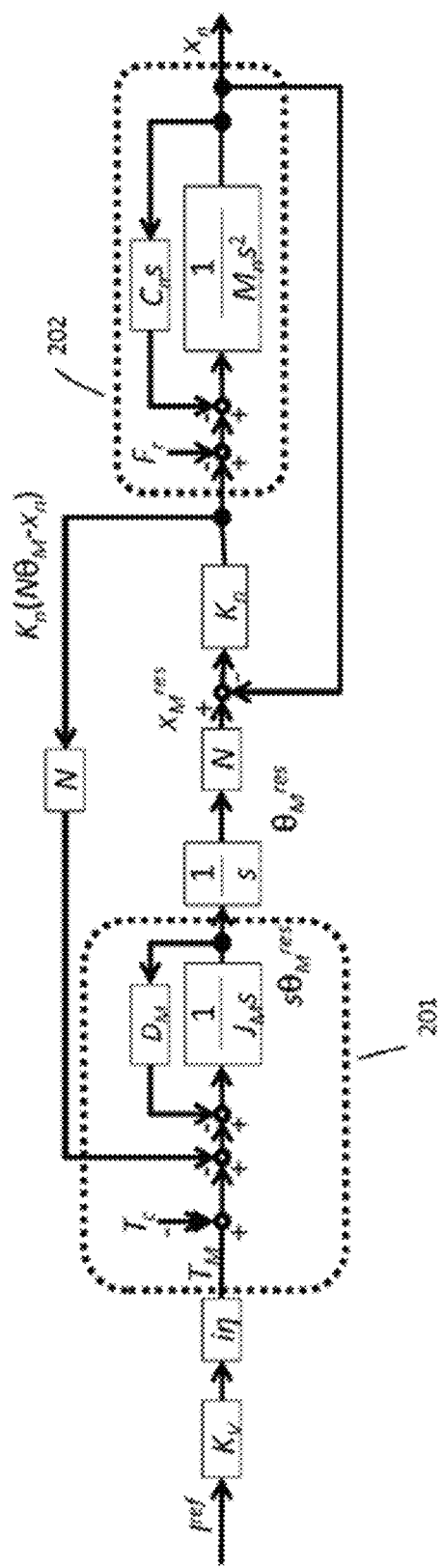
FIG. 11 is a block diagram illustrating the two-inertia system dynamic model according to the third embodiment.

A block diagram illustrating a two-inertia system dynamic model is illustrated in FIG. 11. The part surrounded by a frame 201 corresponds to expression (13) above and the part surrounded by a frame 202 corresponds to expression (14) above. It should be noted here that $x_M$ represents the position of the rod-shaped member 2A. The position $x_M$ of the rod-shaped member 2A can be detected by detecting the rotational angle $\theta_M$ of the driving device 4A (rod-shaped member 2A) using a rotary encoder or the like. $K_n(N\theta_M - x_n)$ represents the elastic force caused by the positional deviation between the rod-shaped member 2A and the opposite member 3A.

Figure 12:
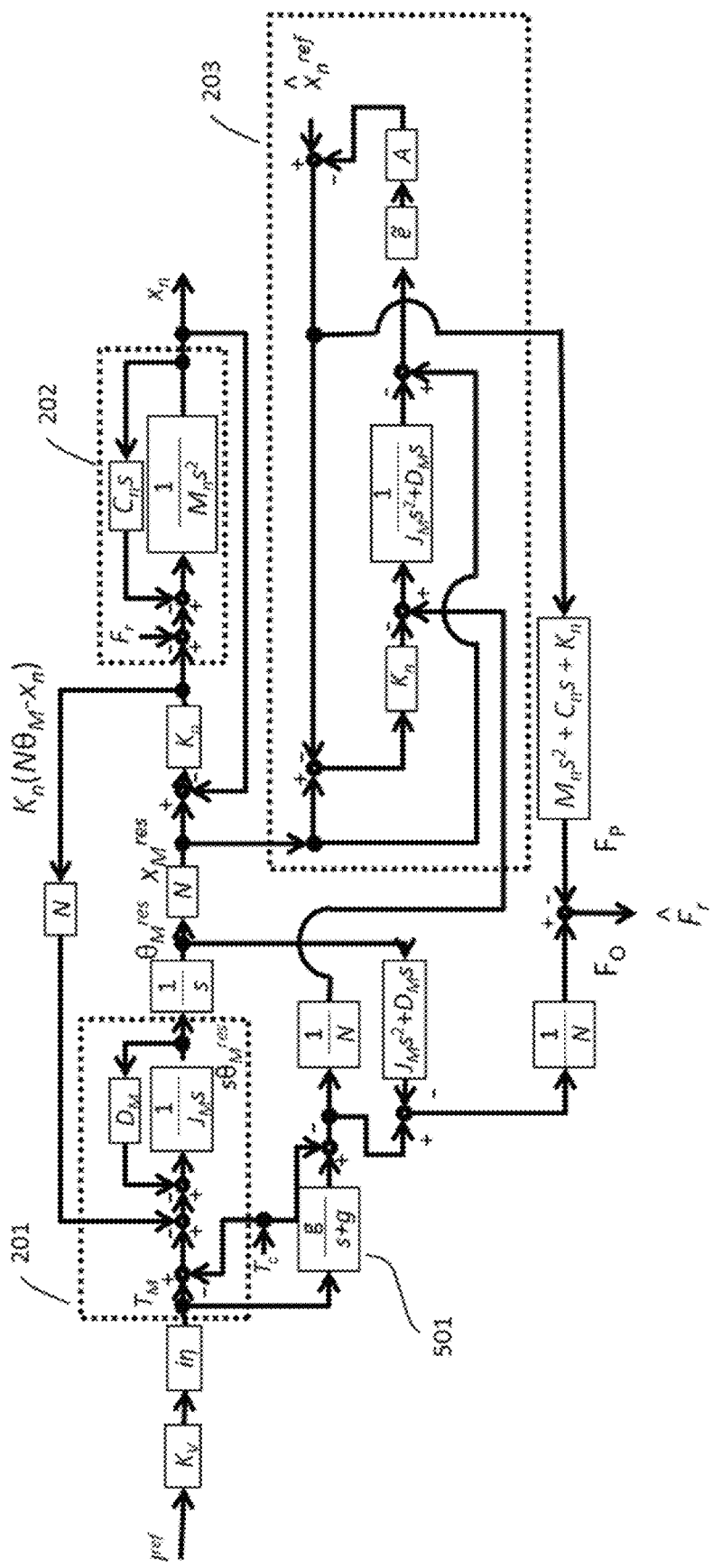
FIG. 12 is a block diagram illustrating the two-inertia system dynamic model according to the third embodiment.

The synchronization loss monitoring portion 301 illustrated in FIG. 1 calculates an external force $F_O$ applied to the opposite member 3A from the driving device 4A based on the torque $T_M$ applied to the rod-shaped member 2A and the rotational angle $\theta_M$ of the rod-shaped member 2A, as illustrated in FIG. 12. The external force $F_O$ is equivalent to the elastic force caused by the positional deviation between the rod-shaped member 2A and the opposite member 3A, as indicated in expression (15) below.

[Math. 7]

$$F_O = K_n(N\theta_M - x_n) = \frac{T_M - T_C - \theta_M(J_M s^2 + D_M s)}{N} \quad (15)$$

The torque $T_M$ of the driving device 4A can be calculated based on a driving current (torque instruction current) value $I_{ref}$ for the driving device 4A. In expression (15) above, the torque $T_M$ of the driving device 4A (rod-shaped member 2A) may be a value processed by a low-pass filter 501 for removing noise in a motor current. As described above, the rotational angle $\theta_M$ of the driving device 4A (rod-shaped member 2A) can be detected by a rotary encoder or the like. Alternatively, the rotational angle $\theta_M$ can be calculated based on an instruction value of the rotational angle transmitted to the driving device 4A. The torque $T_C$ applied constantly, the inertia moment $J_M$ of the driving device 4A (rod-shaped member 2A), the viscosity friction coefficient $D_M$ of the driving device 4A (rod-shaped member 2A), and the rotational motion to linear motion conversion coefficient N may be obtained in advance and may be stored in the memory device 401 in advance.

In addition, the synchronization loss monitoring portion 301 illustrated in FIG. 1 calculates a force $F_P$ required to move the opposite member 3A when the load $F_r$ is not applied to the opposite member 3A based on the position $x_n$ of the opposite member 3A, as illustrated in FIG. 12. The force $F_P$ required to move only the opposite member 3A is given by expression (16) below.

[Math. 8]

$$F_P = M_n s^2 x_n + C_n s x_n + K_n x_n \quad (16)$$

The mass $M_n$ of the opposite member 3A, the viscosity friction coefficient $C_n$ of a guide 33A, and the axial direction stiffness $K_n$ can be obtained in advance and may be stored in the memory device 401 in advance. The position $x_n$ of the opposite member 3A can be detected by a linear encoder such as, for example, a laser displacement gauge. Alternatively, the position $x_n$ of the opposite member 3A is calculated by correcting the estimated value of the position $x_n$, based on the position $x_M$ of the rod-shaped member 2A.

The initial value of the estimated value of the position $x_n$ may be any value, so it may be assumed to be, for example, 0 or a position $x_M^{res}$ of the rod-shaped member 2A. An error e between the actual value and the estimated value of the position $x_n$, is given by expression (17) below.

[Math. 9]

$$\frac{\frac{T_M - T_C}{N} - K_n(X_M^{res} - \hat{x}_n^{ref})}{J_M s^2 + D_M s} - X_M^{res} = \tilde{e} \quad (17)$$

$\hat{x}_n^{ref}$: Estimated value of position $x_n$ $\tilde{e}$: Error

Expression (17) above is multiplied by sN to obtain expression (18) below.

[Math. 10]

$$\frac{T_M - T_C - NK_n(X_M^{res} - \hat{x}_n^{ref})}{J_M s + D_M} - sNX_M^{res} =$$

$$\frac{T_M - T_C - NK_n(X_M^{res} - \hat{x}_n^{ref})}{J_M s + D_M} - s\theta_M^{res} = sN\tilde{e} \quad (18)$$

It should be noted here that $X_M^{res} = N\theta_M^{res}$ in expression (18). The synchronization loss monitoring portion 302 calculates the error e based on, for example, expression (18) above. As is clear from expression (13) above, the error e is 0 when the estimated value of the position $x_n$ is equal to the actual value. Next, the synchronization loss monitoring portion 302 corrects the estimated value of the position $x_n$ according to, for example, expression (19) below.

[Math. 11]

$$\hat{X}_n^{ref} = \hat{x}_n^{ref} - A\tilde{e} \quad (19)$$

$\hat{X}_n^{ref}$: Estimated value of position $x_n$ after correction
$\hat{x}_n^{ref}$: Estimated value of position $x_n$ before correction
A: Constant The synchronization loss monitoring portion 302 calculates the error e again based on expression (18) above using the estimated value of the position $x_n$ corrected by expression (19) above. After that, the synchronization loss monitoring portion 302 repeats the calculation of expression (18) and expression (19) above until the absolute value of the calculated error e is less than a predetermined threshold. The synchronization loss monitoring portion 302 uses the estimated value of the position $x_n$ when the absolute value of the calculated error e becomes less than the predetermined threshold as the position $x_n$ of the opposite member 3A. The part surrounded by a frame 203 in FIG. 12 has the function of correcting the estimated value of the position $x_n$ based on the position $x_M$ of the rod-shaped member 2A.

Furthermore, the synchronization loss monitoring portion 301 illustrated in FIG. 1 calculates the load $F_r$ applied to the opposite member 3A based on the difference between the external force $F_O$ applied to the opposite member 3A from the driving device 4A via the rod-shaped member 2A and the force $F_P$ required to move only the opposite member 3A, as illustrated in FIG. 12.

The synchronization loss monitoring portion 301 illustrated in FIG. 1 compares the load $F_r$ applied to the opposite member 3A with the maximum generable thrust force $F_{max}$ according to the position of the opposite member 3A and monitors whether the load $F_r$ is less than the maximum generable thrust force $F_{max}$, as indicated by expression (20) below. When a sign that the load $F_r$ becomes more than the maximum generable thrust force $F_{max}$ as indicated by expression (21) below has been detected, it is predicted that a synchronization loss of the opposite member 3A with respect to the rod-shaped member 2A possibly occurs. In addition, when the load $F_r$ is more than the maximum generable thrust force $F_{max}$, it is decided that a synchronization loss of the opposite member 3A with respect to the rod-shaped member 2A has occurred.

$$F_r < F_{max} \quad (20)$$

$$F_r > F_{max} \quad (21)$$

Also in the third embodiment, when the synchronization loss monitoring portion 301 has predicted or detected a synchronization loss, the controlling portion 302 stops the driving device 4A.

Fourth Embodiment

Since occurrence of a synchronization loss releases the magnetic coupling between the rod-shaped member 2A and the opposite member 3A, the holding torque is lost and the torque of the driving device 4A is suddenly reduced. The torque of the driving device 4A is recovered at the same time with the generation of a magnetic coupling between the rod-shaped member 2A and the opposite member 3A again. Whether the torque of the driving device 4A has been reduced can be decided by monitoring the difference from the past torque value until the time just before to the torque value at the current time.

For example, in the fourth embodiment, the synchronization loss monitoring portion 301 illustrated in FIG. 1 compares the torque value at the current time with a reference value using a past torque value of the driving device 4A as the reference value and decides that a synchronization loss has not occurred when the difference between the current torque value and the reference value is less than a predetermined threshold or decides that a synchronization loss has occurred when the difference is more than the predetermined threshold.

Figure 13:
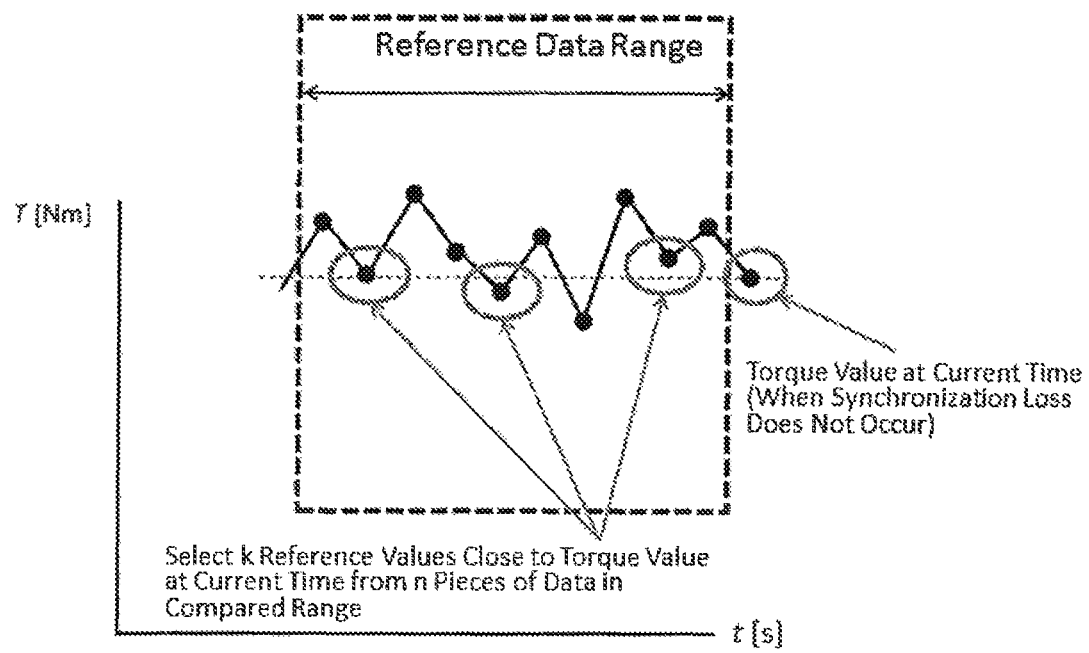
FIG. 13 is a graph used to describe k-nearest neighbor algorithm according to a fourth embodiment.
Figure 14:
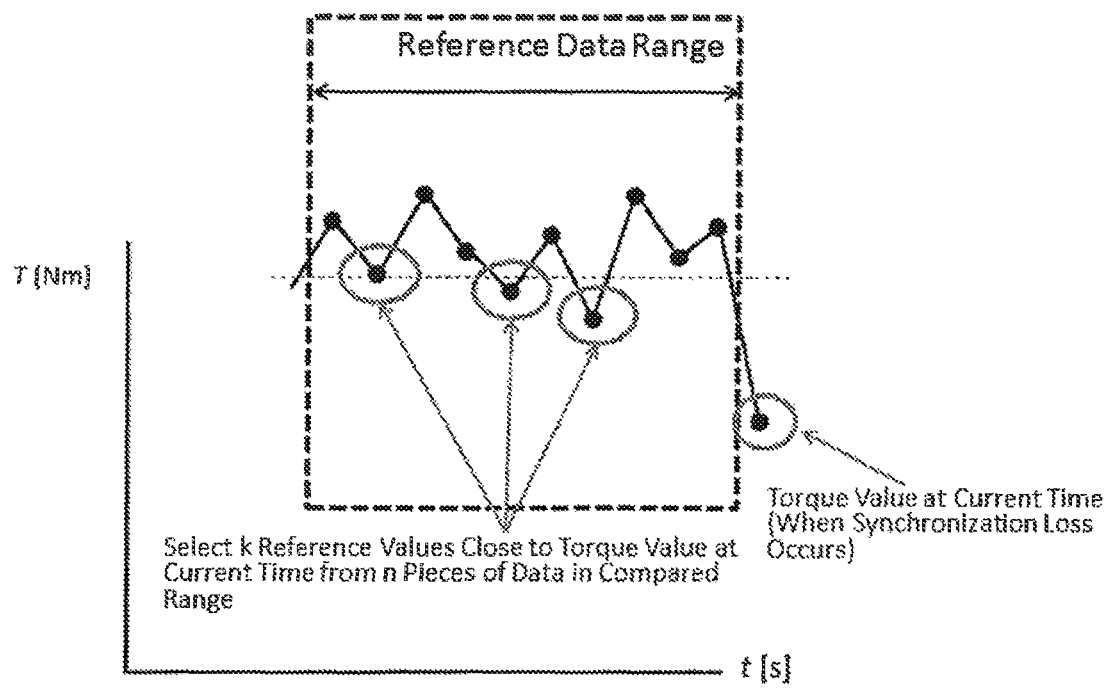
FIG. 14 is a graph used to describe k-nearest neighbor algorithm according to the fourth embodiment.

A difference A(T) between a torque value $T_t$ at the current time and a reference value $T_i$ may be calculated by k-nearest neighbor algorithm as indicated by expression (22) below. As illustrated in FIG. 13 and FIG. 14, k-nearest neighbor algorithm selects k reference values close to the torque value $T_t$ at the current time that are the decision targets from n reference values and obtains an average value A(T) of differences between the torque value $T_t$ at the current time and the reference values $T_i$.

[Math. 12]

$$A(T) = \frac{\left|\sum_{i=1}^{k}(T_i - T_t)\right|}{k} \quad (22)$$

Figure 15A:
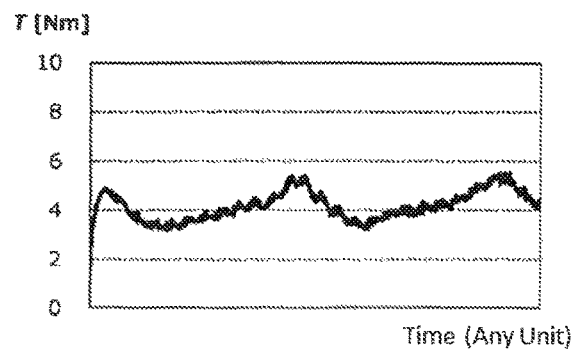
FIGS. 15(a) and 15(b) are graphs used to describe the difference between a reference value and a torque at the current time according to the fourth embodiment.
Figure 15B:
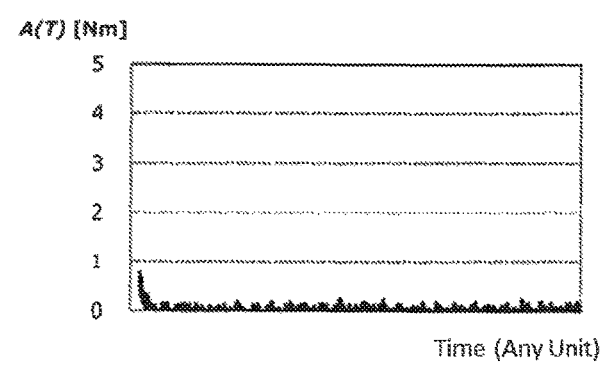
Figure 16A:
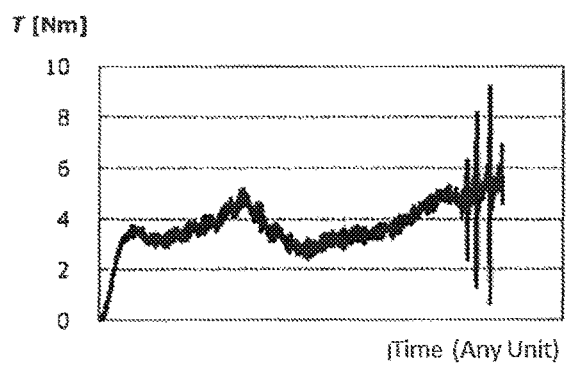
FIGS. 16(a) and 16(b) are graphs used to describe the difference between the reference value and the torque at the current time according to the fourth embodiment.
Figure 16B:
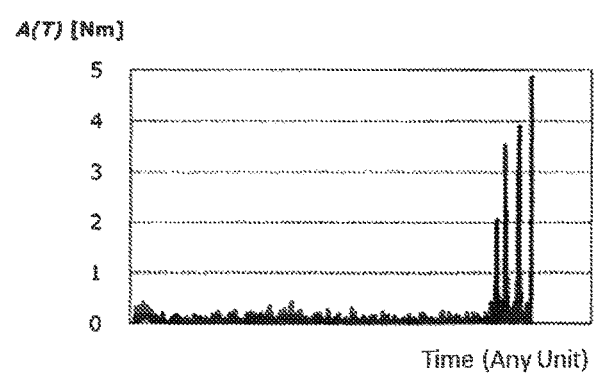

When a synchronization loss does not occur as illustrated in FIG. 15(a), fluctuations in the torque of the driving device 4A are small and the average value A(T) of differences between the torque value $T_t$ at the current time and the reference values $T_i$ is kept small as illustrated in FIG. 15(b). In contrast, when a synchronization loss has occurred as illustrated in FIG. 16(a), fluctuations in the torque of the driving device 4A become large and fluctuations in the average value A(T) of differences between the torque value $T_t$ at the current time and the reference values $T_1$ also become large as illustrated in FIG. 16(b).

The synchronization loss monitoring portion 301 illustrated in FIG. 1 may determine the number of times the difference has exceeded the predetermined threshold to be the number of times the synchronization loss has occurred. It should be noted here that the reference value of the torque may be the average value.

OTHER EMBODIMENTS

Although the invention has been described by embodiments as described above, it should not be understood that the description and the drawings that are parts of the disclosure limit the invention. It must be apparent to those skilled in the art that various alternative embodiments, examples, and operational techniques are clarified based on the disclosure. For example, the articles transferred to or from the temperature-controlled furnace are not limited to the inclusion of medicines, but may include foods, beverages, precision parts, etc., as well as any articles to be controlled in temperature. The temperature-controlled furnace of the temperature management apparatus is not limited to the freeze drying furnace and may be a fermentation furnace or includes any furnace in which the suppression of the internal temperature distribution unevenness and the suppression of the dust generation are desired. Furthermore, the shape of the opposite members is not limited to the nut shape, but may be, for example, a concave shape. In that case, the rod-shaped member passes through a concave portion of a concave opposite member. S pole magnetized zones and N pole magnetized zones are alternately provided on the side surface of the concave portion of the concave opposite member. As described above, it should be understood that the invention encompasses various embodiments and the like not described in the specification.

REFERENCE SIGNS LIST

1: temperature-controlled furnace, 2A, 2B, 102A, 102B: rod-shaped member, 3A, 3B, 103A, 103B: opposite member, 4A, 4B, 104A, 104B: driving device, 5: article, 6, 106: contact member, 7: shelf board, 11A, 11B: mandrel, 12A, 12B: bearing, 20A, 30A: thin-walled pipe, 22A: coupler, 31: guide ring, 33A: guide, 134A, 134B: belt, 201, 202: frame, 300: central processing unit, 301: synchronization loss monitoring portion, 302: controlling portion, 401: memory device, 501: low-pass filter

The invention claimed is:

1. A transfer apparatus comprising:
a rod-shaped member that comprises a magnetic material;
an opposite member that is opposed to a part of a side surface of the rod-shaped member and comprises a magnetic material;
a driving device that rotates the rod-shaped member or the opposite member about a central axis of the rod-shaped member to change a relative position between the rod-shaped member and the opposite member; and
one or more processor devices that conduct synchronization loss monitoring by predicting or detecting a synchronization loss between the rod-shaped member and the opposite member based on a fluctuation of a torque of the driving device,
wherein the driving device rotates the rod-shaped member about the central axis of the rod-shaped member, and
the one or more processor devices calculate a load applied to the opposite member based on a difference between an external force applied to the opposite member by the driving device via the rod-shaped member and a force required to move the opposite member when no load is applied to the opposite member, and predict or detect the synchronization loss based on the calculated load.

2. The transfer apparatus according to claim 1, wherein the external force applied to the opposite member by the driving device via the rod-shaped member is calculated based on the torque of the driving device.

3. The transfer apparatus according to claim 1, wherein the force required to move the opposite member when no load is applied to the opposite member is calculated based on a position of the opposite member.

4. The transfer apparatus according to claim 1, wherein the one or more processor devices predict or detect the synchronization loss by comparing a maximum value of a thrust force generated by a magnetic coupling between the rod-shaped member and the opposite member with the load.

* * * * *